Patented June 14, 1932

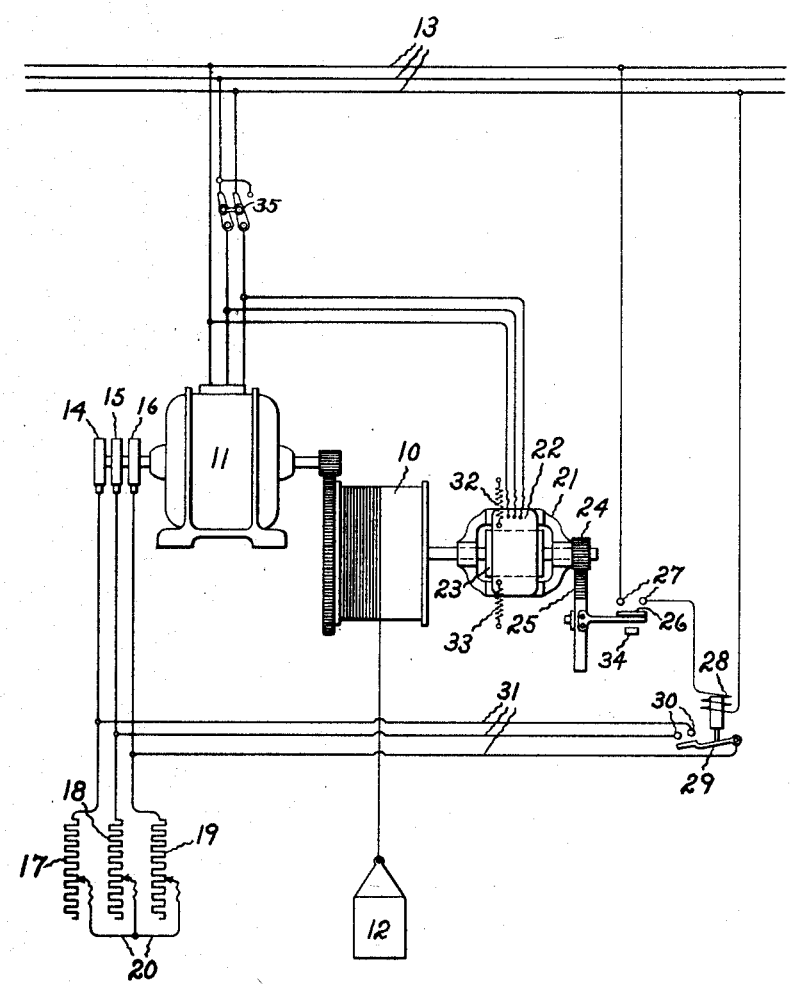

1,863,412

UNITED STATES PATENT OFFICE

MARCEL PATEAU, OF SEINE, FRANCE, ASSIGNOR TO GENERAL ELECTRIC COMPANY, A CORPORATION OF NEW YORK

SPEED RESPONSIVE MEANS

Application filed August 20, 1929, Serial No. 387,173, and in France September 6, 1928.

This invention relates to means for comparing two speeds, more particularly to means responsive to variations in one speed with respect to a speed of reference, and has for its object a simple, reliable, and efficient device of this character.

The invention has application in electrical control systems for various types of apparatus, for example electric hoists, wherein a control operation is effected in dependence upon the speed of one member with relation to a speed of reference.

In carrying out the invention in one form a squirrel cage induction motor is utilized as the speed responsive means. The stator of this motor is energized with currents having a frequency proportional to the speed of reference, while the rotor of the induction motor is driven at a speed proportional to the speed to be compared. The stator is mounted for a limited freedom of rotation in response to the reactive torque on the stator so that the stator is moved from one position to another as its rotor speed becomes higher or lower than the speed of reference.

For a more complete understanding of the invention reference should be had to the accompanying drawing, the single figure of which shows a control system for hoists embodying the invention.

Referring to the drawing, in the arrangement shown the hoisting drum or windlass 10 is driven by means of an electric motor 11 which is provided with a suitable reversing switching means, not shown, whereby the motor may be driven in the appropriate direction to raise or lower the cage 12 as desired. As shown, the motor 11 is a 3-phase induction motor provided with a slip ring rotor and having its stator provided with a suitable armature winding which is connected through the switching mechanism, to a three-phase source of supply 13. Across the rotor slip rings 14, 15, and 16 are connected three variable resistances 17, 18, and 19. As shown, these resistances are connected in star relation through conductors 20 which lead to variable taps on the resistances. For example, the resistances may be controlled by means of a suitable manually operated switch, not shown, so as to control the speed of the motor. It will be understood that with the motor operating at full speed the resistances will be entirely cut out so that the three slip rings 14, 15, and 16 will be short circuited.

In the operation of hoists it will be understood that with a heavy overhauling load the driving motor may be driven above synchronous speed so as to act as a regenerative brake. For example, in the arrangement shown when the cage 12 is being lowered with a heavy load the motor 11 may be driven above its synchronous speed and thereby act as a brake. It is desirable under these conditions to assure that the resistances 17, 18, and 19 in the rotor circuit of the driving motor are entirely short circuited, whereby the motor will exert its full regenerative braking torque and thus avoid any possibility of the hoist being lowered at an excessively high rate of speed.

For the purpose of short circuiting the resistances under these conditions I provide a relatively small auxiliary control motor 21 of a three-phase squirrel cage induction type. This motor is utilized as a device for comparing the actual rotor speed of the driving motor 11 with the normal running speed of the motor corresponding to the frequency of the supply source 13. As shown, the stator 22 of the auxiliary motor 21, which stator is provided with a suitable three-phase armature winding, is electrically connected to the supply source 13, while the rotor 23 of the auxiliary motor is directly connected to the hoisting drum 10 although it obviously may be connected through gearing having a suitable speed ratio to the motor 11 itself, the requirement being that the driving connections of the rotor 23 with the motor 11 have a speed ratio such that the rotor 23 is driven at a synchronous speed with respect to its stator when the motor 11 is operated at full running speed. In other words, the synchronous speed of the field of the auxiliary motor is substantially the same as the speed of reference, i. e. the running speed of the motor 11.

The stator 22 of the auxiliary motor is furthermore mounted for rotation through a limited angle on suitable bearings, not shown, and it is mechanically connected through a pinion 24 and a rack 25 meshing with the pinion to a switch contact 26. With this arrangement when the stator is turned in a direction to raise the rack 25 the contact 26 is likewise raised to short circuit the contacts 27 whereby a circuit is closed to energize the operating coil 28 of switch 29. This switch 29 is operated when the coil 28 is energized to short circuit the contacts 30 and thus close circuits through the conductors 31 whereby the three slip rings 14, 15, and 16 are short circuited. The stator 22 is biased by means of a counterpoise, shown as centering springs 32 and 33, to a position in which the contact 26 is out of engagement with the contacts 27 whereby the coil 28 is deenergized. A stop 34 is provided to limit the movement of the rack 25 in a downward direction.

In the operation of the system, when the driving motor 11 is operating at full running speed, the rotor 23 will be driven at its synchronous speed with respect to its field and consequently no torque will then be applied to its stator 22. Under these conditions, therefore, the stator will be turned by the springs 32 and 33 to its central position. When the driving motor 11 is operating at a speed lower than its full running speed, the rotor 23 will likewise be driven at a speed lower than its synchronous speed and consequently a reactive torque will be applied to the stator 22, which torque turns the stator in a direction to lower the rack 25. Under conditions of operation in which the driving motor 11 is being driven above its synchronous speed, thus acting as a brake, the rotor 23 will likewise be driven above its synchronous speed and consequently a reactive torque will be exerted upon the stator 22, this torque being in the opposite direction with respect to the reactive torque on the stator 22 when the motor 11 is operating below its synchronous speed. This reactive torque is in a direction to raise the rack 25 and when this torque exceeds a predetermined amount, by reason of the required change in speed for which the springs 32 and 33 are adjusted, the stator is turned sufficiently to bring the switch contact 26 into engagement with the contacts 27 whereby the coil 28 is energized. This closes the switch 29 and thus assures that the slip rings are short circuited whereby the motor is caused to exert its full braking torque and excessive speeds are prevented.

It will be understood that for the hoisting operation, the auxiliary motor 21 will be reversed with the motor 11 by suitable switching means 35 in the common supply connections for these motors.

What I claim as new and desire to secure by Letters Patent of the United States is:

1. The combination with a polyphase alternating current driving motor, of an auxiliary polyphase alternating current motor of the induction type provided with a stator member having an armature winding connected to the same electrical supply source as said driving motor, and with a rotor connected to be driven by said driving motor at substantially the synchronous speed of said auxiliary motor when the driving motor is operating at a running speed, said stator having a limited freedom of rotation in response to its torque reaction with said rotor, and control means for said driving motor operated by movement of said stator.

2. The combination with a hoist, of a polyphase induction driving motor connected to drive said hoist, said motor being provided with a slip ring rotor winding, a variable resistance connected in circuit with said rotor, an auxiliary induction motor having its rotor driven by said driving motor and its stator provided with an armature winding connected to the same supply source as said driving motor, said stator being mounted for limited rotation in response to its torque reaction with said rotor, and control means for said resistance connected to said stator.

3. The combination with a polyphase induction driving motor provided with a slip ring rotor, of a resistance connected in circuit with said rotor, and means for shunting said resistance when the motor is driven as a brake by an overhauling load comprising a control motor of the induction type having its rotor connected to be driven by said driving motor and its stator winding energized from the same supply source as said driving motor, and means responsive to the reversal of the reactive torque between said stator and rotor when said driving motor is overhauled for short circuiting said resistance.

4. The combination with a polyphase alternating current driving motor provided with a rotor winding, a resistance connected in circuit with said rotor, an auxiliary induction motor having its rotor driven by said driving motor and its stator provided with a polyphase winding connected to the same supply source as said driving motor, said stator being mounted for rotation in response to its torque reaction with said rotor, control means for said resistance and a driving connection between said control means and said stator.

In witness whereof, I have hereunto set my hand this 30th day of July, 1929.

MARCEL PATEAU.